(12) United States Patent
Chen et al.

(10) Patent No.: US 11,599,190 B2
(45) Date of Patent: Mar. 7, 2023

(54) PIVOTABLE ACOUSTIC DEVICES

(71) Applicant: Hewlett-Packard Development Company, L.P., Spring, TX (US)

(72) Inventors: Chih-Hua Chen, Taipei (TW); Cheng-Yi Yang, Taipei (TW); Hai-Lung Hung, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/356,460

(22) Filed: Jun. 23, 2021

(65) Prior Publication Data
US 2022/0413600 A1  Dec. 29, 2022

(51) Int. Cl.
*G06F 3/01* (2006.01)
*H04R 1/02* (2006.01)
*G06F 3/16* (2006.01)

(52) U.S. Cl.
CPC .............. *G06F 3/012* (2013.01); *G06F 3/165* (2013.01); *H04R 1/026* (2013.01); *H04R 1/028* (2013.01)

(58) Field of Classification Search
CPC ......... G06F 3/012; G06F 3/165; H04R 1/026; H04R 1/028
See application file for complete search history.

(56) References Cited

U.S. PATENT DOCUMENTS

| | | | |
|---|---|---|---|
| 5,812,369 A | 9/1998 | Hsu | |
| 5,838,537 A | 11/1998 | Lundgren | |
| 5,917,695 A | 6/1999 | Youn | |
| 7,453,440 B2 | 11/2008 | Sun | |
| 2009/0285429 A1* | 11/2009 | Wang | H04R 5/02 381/386 |
| 2010/0158287 A1* | 6/2010 | Xu | H04R 1/403 381/387 |
| 2014/0104774 A1* | 4/2014 | Lu | G06F 1/1637 361/679.27 |
| 2018/0329672 A1* | 11/2018 | Sadak | G06F 1/1677 |
| 2021/0218589 A1* | 7/2021 | Shimizu | G06T 3/0018 |
| 2022/0011909 A1* | 1/2022 | Ma | G06F 3/0482 |

* cited by examiner

*Primary Examiner* — Andrew L Sniezek
(74) *Attorney, Agent, or Firm* — Knobbe, Martens, Olson & Bear, LLP

(57) ABSTRACT

In an example, an electronic device may include a housing and a first acoustic device pivotally disposed in the housing. The first acoustic device may move between a first position within the housing and a second position outside the housing. The first acoustic device may direct an acoustic signal in a direction. Further, the electronic device may include a camera to capture an image of an area in front of the electronic device. Furthermore, the electronic device may include a processor operatively coupled to the camera and the first acoustic device. The processor may determine a location of a facial feature of an operator using the captured image. Further, the processor may control an angle of rotation of the first acoustic device relative to the housing based on the location of the facial feature to modify the direction of the acoustic signal.

18 Claims, 11 Drawing Sheets

PIVOTABLE ACOUSTIC DEVICES

BACKGROUND

The emergence and popularity of mobile computing has made portable electronic devices, due to their compact design and light weight, a staple in today's marketplace. An example electronic device may include a notebook computer, a tablet computer, a convertible device, and the like. Due in part to their mobile nature, such electronic devices may often be provided with a speaker disposed within a housing of the electronic devices and include multiple sound emission holes defined in the housing for outputting sound produced by the speaker.

BRIEF DESCRIPTION OF THE DRAWINGS

Examples are described in the following detailed description and in reference to the drawings, in which.

DETAILED DESCRIPTION

Figure 1A:
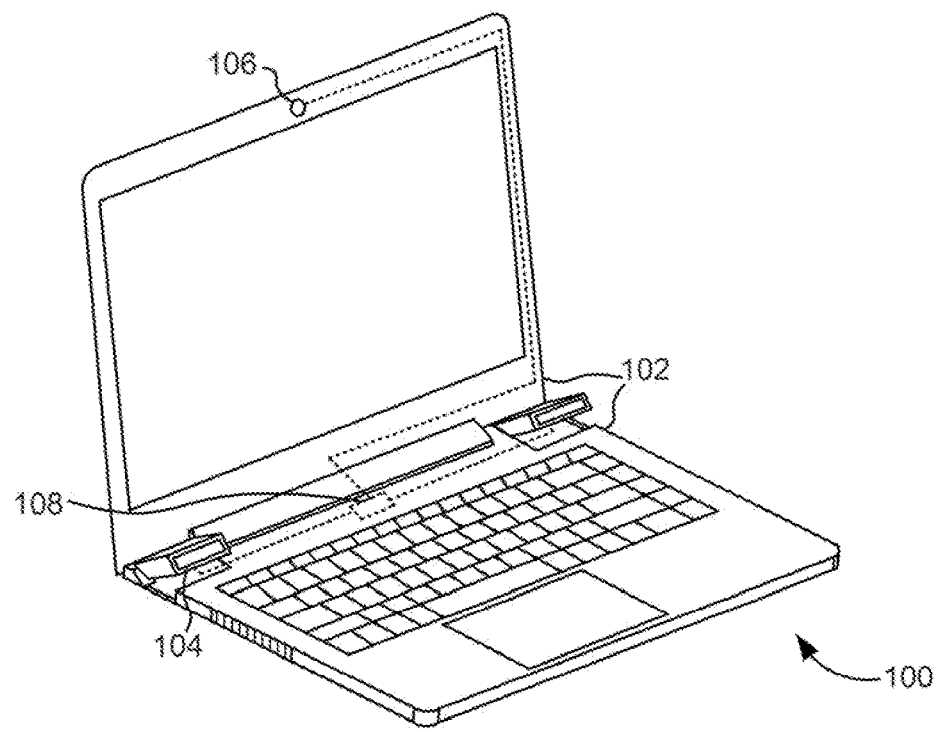
FIG. 1A is a perspective view of an example electronic device, including a processor to control an angle of rotation of a first acoustic device.

Electronic devices such as notebook computers may include a base housing (e.g., a keyboard housing) and a display housing pivotably attached to the base housing. Such electronic devices may include an audio output device (e.g., a speaker) mounted in the base housing. Further, multiple sound emission holes may be defined in the base housing to output sound (i.e., acoustic signals) produced by the speaker. However, such sound emission holes are defined in peripheral walls of the base housing and are not aimed at a user (i.e., an operator of the electronic device), which may limit the quality of the sound experience for the user.

In an example, the quality of the sound may depend on a location of the speaker within the base housing. For example, the speaker may be located within the base housing, adjacent to the keyboard, and oriented so that the sound may be projected upwards from the surface of the electronic device. Since the user's ears may not be located over the surface of the electronic device, a significant amount of the sound produced by the speaker may be lost, thus reducing the quality of the sound output.

Some example electronic devices may include retractable speakers to direct the sound towards the user. The retractable speakers may be rotatably coupled to the base housing to move between a retracted position and a plurality of positions outside the base housing. However, such retractable speakers may have to be manually controlled, i.e., the user may have to manually rotate the speakers to different positions, which may affect the user experience.

In other examples, the electronic devices may include retractable speakers pivotally mounted within the base housing via a resilient member. In this example, when the display housing is in the closed position, the retractable speakers may be received in a groove of the base housing and the resilient member may be compressed by the display housing. Further, when the display screen is in the open position, the retractable speakers may protrude out from the groove and the resilient member may be released. However, such retractable speakers may project sound in a defined direction and the direction of projection of the sound cannot be controlled. Hence, the sound may be dispersed into no-user direction.

Examples described herein may provide an electronic device including a housing, an acoustic device, a camera, and a processor. The acoustic device may be pivotally disposed in the housing to move between a storage position within the housing and an extended position outside the housing. During operation, the processor may determine a location of a facial feature of an operator via a camera. Further, the processor may control an angle of rotation of the acoustic device relative to the housing based on the location of the facial feature, for instance, to direct an acoustic signal towards the facial feature. In this example, the processor may control the direction of the acoustic signal in a vertical plane.

In another example, the acoustic device may include a signal projection assembly to direct an acoustic signal in a defined direction. The signal projection assembly may be pivotally disposed within the acoustic device. During operation, the processor may control a pivotal movement (e.g., an angle of rotation) of the signal projection assembly based on the location of the facial feature. In this example, the processor may control the direction of the acoustic signal in a horizontal plane. Thus, examples described herein may control the direction of projection of the acoustic signal in the horizontal plane, the vertical plane, or a combination thereof to project the acoustic signal towards the user's ear(s), thereby reducing the dispersion of the acoustic signal into no-user direction.

In yet another example, the processor may estimate a distance of the operator's face or facial feature from the electronic device via the camera (e.g., a time of flight (ToF) camera). Further, the processor may control an intensity of the acoustic signal based on the estimated distance. Thus, the acoustic device described herein may deliver the acoustic signal with relatively low power consumption.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a perspective view of an example electronic device 100, including a processor 108 to control an angle of rotation of a first acoustic device 104. Example electronic device 100 may include a laptop computer, a notebook computer, a tablet computer, or the like. As shown in FIG. 1A, electronic device 100 may include a housing 102. In some examples, housing 102 may house different components such as a keyboard, a battery, a touchpad, and the like, depending on the functions of electronic device 100.

Further, electronic device 100 may include first acoustic device 104 pivotally disposed in housing 102 to direct an acoustic signal (e.g., sound output) in a direction. For example, first acoustic device 104 may produce the acoustic signal and project the acoustic signal in the direction towards an operator. In an example, first acoustic device 104 may move between a first position (e.g., a retracted position) within housing 102 and a second position outside housing 102. In this example, the second position may correspond to one of multiple positions outside housing 102. In some examples, first acoustic device 104 may be pivotally disposed in housing 102 via a hinge assembly. The hinge assembly may also provide a frictional force to hold first acoustic device 104 at the multiple positions.

Furthermore, electronic device 100 may include a camera 106 to capture an image of an area in front of electronic device 100. For example, camera 106 may be a built-in camera of electronic device 100 or an external camera removably attached to electronic device 100 to capture the image of the area in front of electronic device 100.

Further, electronic device 100 may include processor 108 operatively coupled to camera 106 and first acoustic device 104. Processor 108 may be any type of central processing unit (CPU), microprocessor, or processing logic that interprets and executes machine-readable instructions stored in a machine-readable storage medium. For example, processor 108 may be implemented as engines or modules including any combination of hardware and programming to implement the functionalities described herein.

During operation, processor 108 may determine a location of a facial feature of the operator using the captured image. An example facial feature may include an ear. In an example, processor 108 may retrieve information identifying and describing the facial feature of the operator from the captured image. Further, processor 108 may compare the retrieved information with a set of stored facial landmarks and determine the location of the facial feature based on the comparison. In some examples, processor 108 may apply a facial feature recognition algorithm to the captured image to determine the location of the facial feature.

Further, processor 108 may control an angle of rotation of first acoustic device 104 relative to housing 102 based on the location of the facial feature to modify the direction of the acoustic signal. In an example, processor 108 may rotate first acoustic device 104 based on the location of the facial feature to adjust the direction of the acoustic signal towards the facial feature (i.e., an ear) of the operator.

Figure 1B:
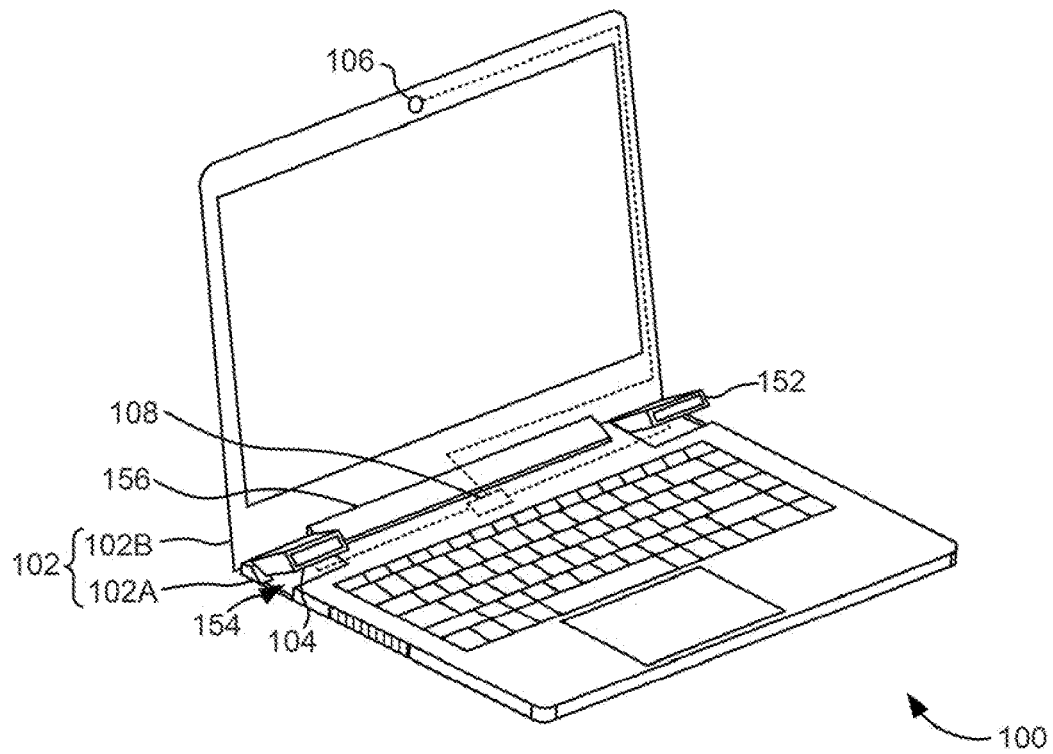
FIG. 1B is a perspective view of the example electronic device of FIG. 1A, depicting additional features.

FIG. 1B is a perspective view of example electronic device 100 of FIG. 1A, depicting additional features. For example, similarly named elements of FIG. 1B may be similar in structure and/or function to elements described with respect to FIG. 1A. As shown in FIG. 1B, housing 102 may include a base housing 102A and a display housing 102B that may be rotatably connected to base housing 102A via a hinge 156. For example, base housing 102A may house a keyboard, a battery, a touchpad, and so on, and display housing 102B may house a display panel.

Further, electronic device 100 may include a second acoustic device 152 pivotally disposed in housing 102. In an example, second acoustic device 152 may move between a first position within housing 102 and a second position outside housing 102. In this example, the second position may correspond to one of multiple positions of second acoustic device 152 outside housing 102.

During operation, processor 108 may determine a location of a first facial feature and a second facial feature of the operator using the captured image. An example first facial feature and second facial feature may be a left ear of the operator and a right ear of the operator, respectively. Further, processor 108 may control the angle of rotation of first acoustic device 104 relative to housing 102 based on the location of the first facial feature. Furthermore, processor 108 may control an angle of rotation of second acoustic device 152 relative to housing 102 based on the location of the second facial feature. For example, a width of electronic device 100 may be wider than a head/face of the operator. Therefore, first acoustic device 104 and second acoustic device 152 may be disposed at a top right corner and a top left corner, respectively, of a keyboard-side surface of base housing 102A to facilitate maximum reflection angle coverage for the acoustic signal.

Further, base housing 102A may include a groove 154. In an example, first acoustic device 104 may be pivotally mounted in groove 154, for instance, via a hinge. When electronic device 100 is in the first position, first acoustic device 104 may be received in groove 154. Further, when electronic device 100 is in the second position, first acoustic device 104 may be positioned out of groove 154 (e.g., upward from the keyboard-side surface of base housing 102A) based on the location of the facial feature. Similarly, base housing 102A may include another groove for receiving second acoustic device 152.

Figure 2A:
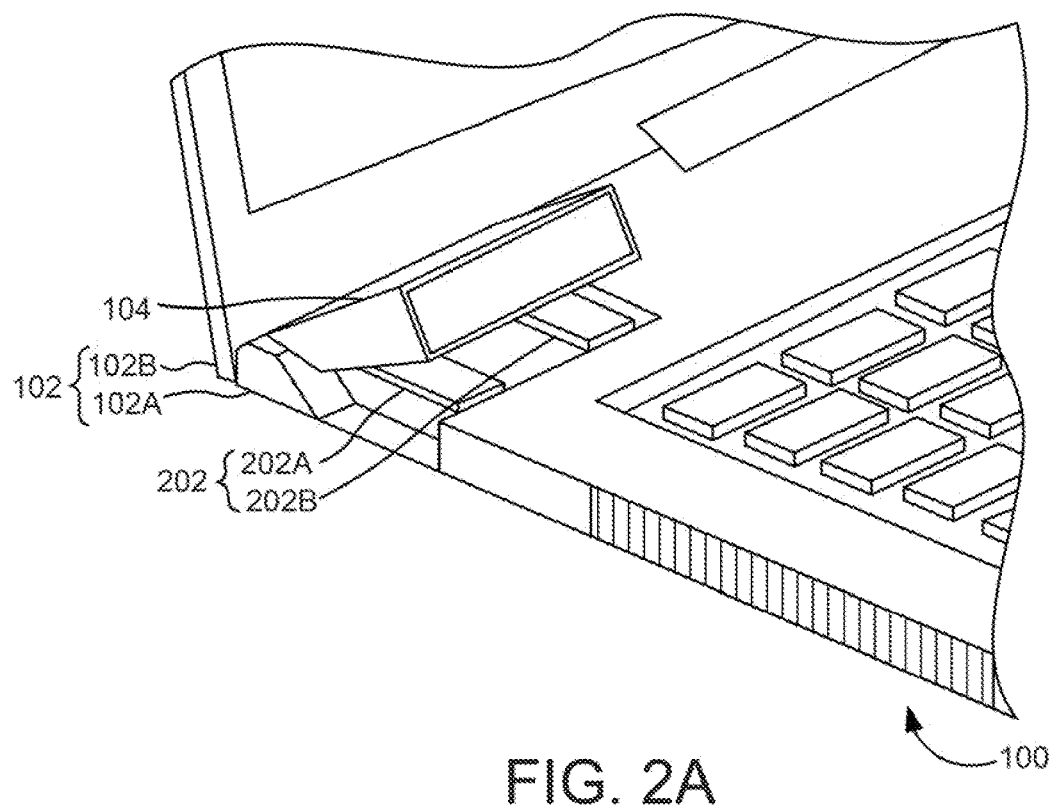
FIG. 2A is a perspective view of a portion of the example electronic device of FIGS. 1A and 1B, depicting an electromagnet assembly to pivotally move the first acoustic device.

FIG. 2A is a perspective view of a portion of example electronic device 100 of FIGS. 1A and 1B, depicting an electromagnet assembly 202 to pivotally move first acoustic device 104. For example, similarly named elements of FIG. 2A may be similar in structure and/or function to elements described with respect to FIGS. 1A and 1B. As shown in FIG. 2A, electronic device 100 may include electromagnet assembly 202 disposed within housing 102 (e.g., base housing 102A). During operation, processor 108 (e.g., as shown in FIGS. 1A and 1B) may control the angle of rotation of first acoustic device 104 relative to housing 102 via electromagnet assembly 202. In an example, electromagnet assembly 202 may include a first electromagnet 202A and a second electromagnet 202B. In this example, processor 108 may control first electromagnet 202A to attract first acoustic device 104 (e.g., via a magnetic element disposed in first acoustic device 104) to pivotally move first acoustic device 104 towards housing 102. Further, processor 108 may control second electromagnet 202B to repel first acoustic device 104 to pivotally move first acoustic device 104 away from housing 102. Thus, processor 108 may selectively control first electromagnet 202A or second electromagnet 202B based on the location of the facial feature.

In other examples, electromagnet assembly 202 may also be implemented using a single electromagnet. Processor 108 may control the angle of rotation of first acoustic device 104 relative to housing 102 using the single electromagnet. For example, processor 108 may control a direction of current to the electromagnet to cause the electromagnet to generate a magnetic field that attracts or repels first acoustic device 104.

Figure 2B:
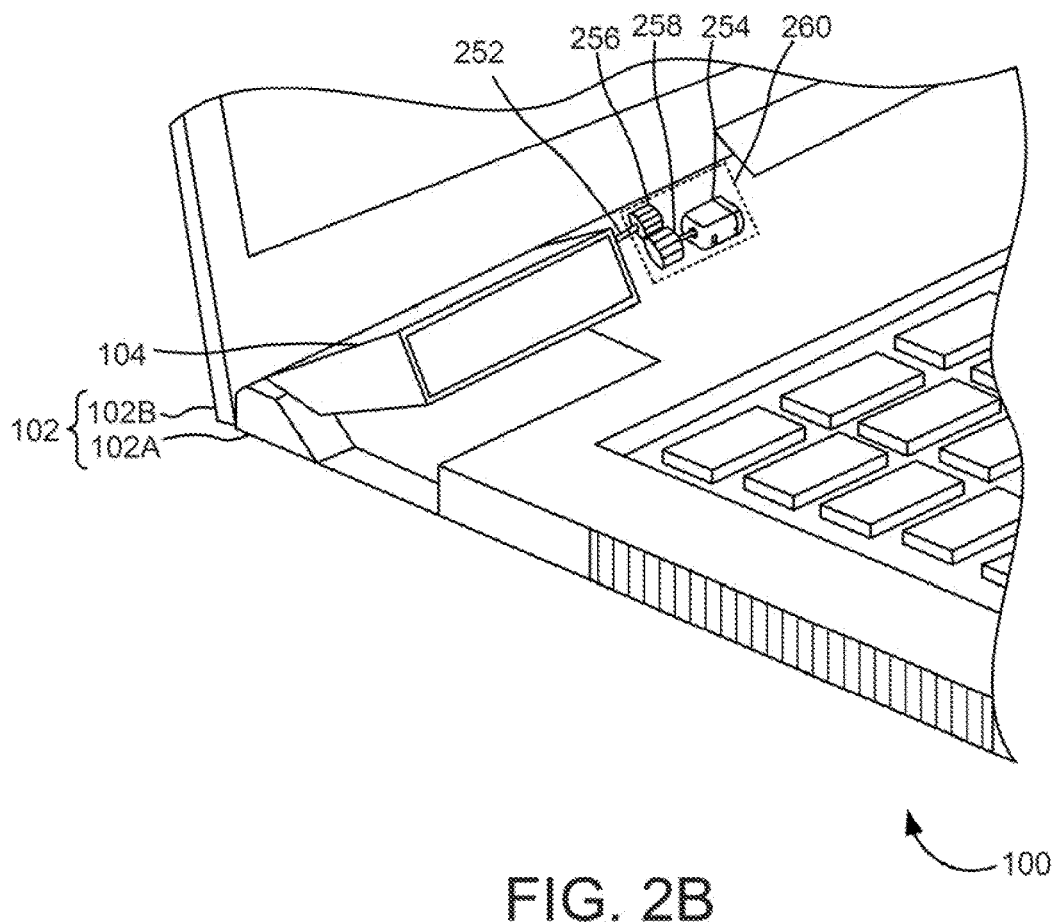
FIG. 2B is a perspective view of a portion of the example electronic device of FIGS. 1A and 1B, depicting a motor assembly to pivotally move the first acoustic device.

FIG. 2B is a perspective view of a portion of example electronic device 100 of FIGS. 1A and 1B, depicting a motor assembly 260 to pivotally move first acoustic device 104. For example, similarly named elements of FIG. 2B may be similar in structure and/or function to elements described with respect to FIGS. 1A and 1B. As shown in FIG. 2B, electronic device 100 may include a hinge 252 to pivotally connect first acoustic device 104 to housing 102 (e.g., base housing 102A). Further, electronic device 100 may include motor assembly 260 disposed within base housing 102A to move first acoustic device 104 relative to base housing 102A based on the location of the facial feature.

In an example, motor assembly 260 may include an electric motor 254, a first gear wheel 258 connected to electric motor 254, and a second gear wheel 256 mounted on hinge 252 at an end. As shown in FIG. 2B, first gear wheel 258 may engage with second gear wheel 256. In this example, electric motor 254 may rotate first acoustic device 104 relative to base housing 102A via first gear wheel 258 and second gear wheel 256. Example electric motor 254 may be a stepper motor. During operation, processor 108 may control the angle of rotation of first acoustic device 104 relative to housing 102 via motor assembly 260.

Figure 3:
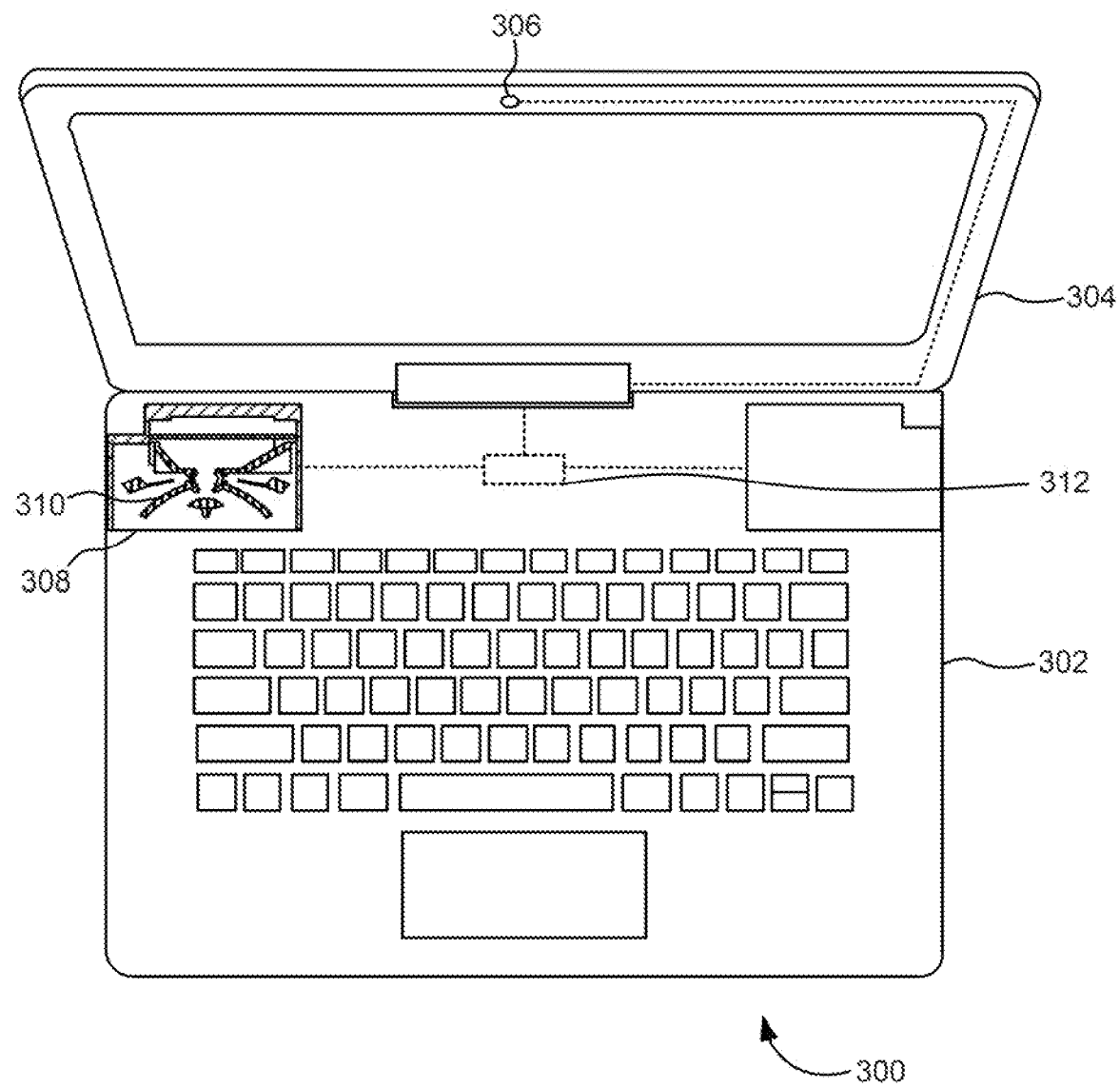
FIG. 3 is a top view of an example electronic device, including a processor to control a pivotal movement of a signal projection assembly of an acoustic device.

FIG. 3 is a top view of an example electronic device 300, including a processor 312 to control a pivotal movement of a signal projection assembly 310 of an acoustic device 308. Example electronic device 300 may include a base housing 302 and a display housing 304 that may be rotatably connected to base housing 302. For example, base housing 302 may house a keyboard, a battery, a touchpad, and so on and display housing 304 may house a display panel. In other examples, display housing 304 and base housing 302 may house other components depending on the functions of electronic device 300.

As shown in FIG. 3, display housing 304 may include a sensor 306. Example sensor 306 may include a webcam, an infrared proximity sensor, a stereoscopic camera, an ultrasonic sensor, a depth camera, or the like. In an example, sensor 306 may capture an image of an area in front of electronic device 300.

Further, base housing 302 may include acoustic device 308 pivotably disposed within base housing 302. In an example, acoustic device 308 may move between a first position within base housing 302 and a second position outside base housing 302. Further, acoustic device 308 may include signal projection assembly 310 pivotally disposed within acoustic device 308 to direct an acoustic signal in a direction. particularly, FIG. 3 illustrates a cut-away top portion of acoustic device 308 to depict signal projection assembly 310. Example signal projection assembly 310 is described in FIG. 4A.

Furthermore, electronic device 300 may include processor 312. In an example, processor 312 may be disposed in base housing 302 or display housing 304. During operation, processor 312 may detect a movement of a facial feature of an operator via sensor 306. Further, processor 312 may control a pivotal movement of signal projection assembly 310 based on the detected movement of the facial feature. In this example, processor 312 may control an angle of rotation of signal projection assembly 310 to modify the direction of the acoustic signal in a horizontal plane.

In another example, processor 312 may control an angle of rotation of acoustic device 308 relative to base housing 302 based on the detected movement of the facial feature. In this example, processor 312 may control the angle of rotation of acoustic device 308 to modify the direction of the acoustic signal in a vertical plane. Thus, electronic device 300 described herein may adjust the direction of the acoustic signal towards the facial feature of the operator.

Figure 4A:
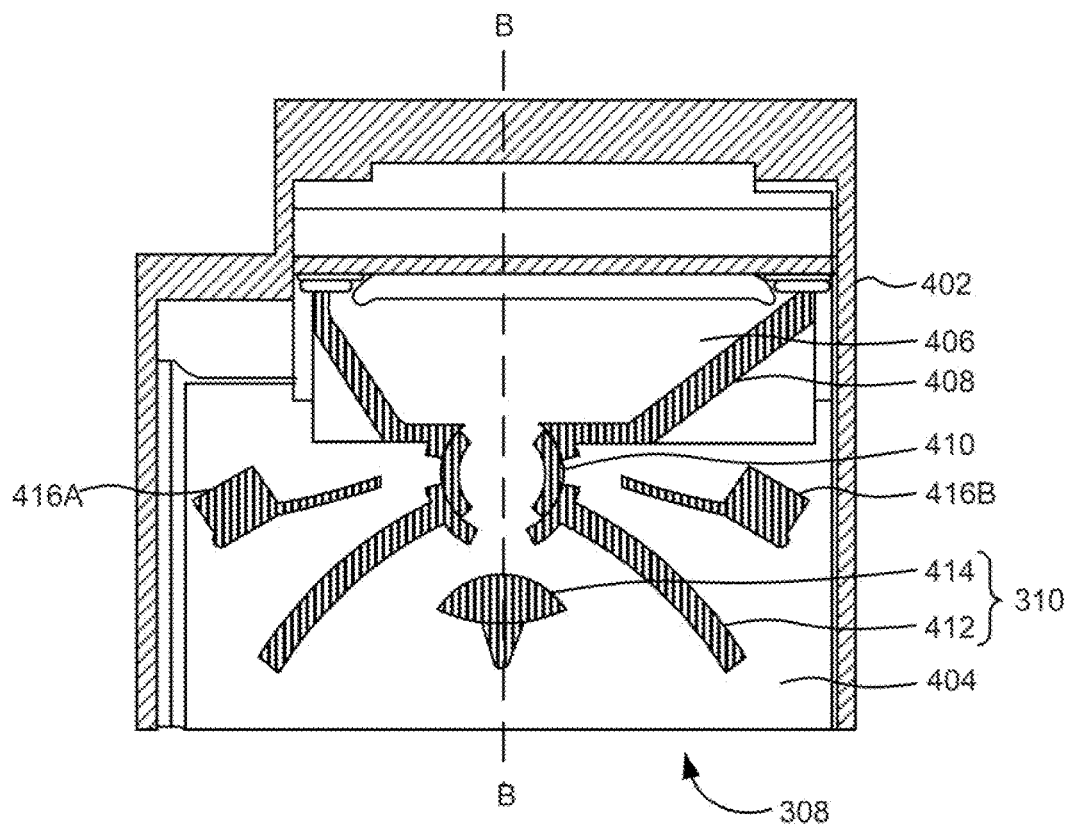
FIG. 4A is a schematic cross-sectional top view of the example acoustic device of FIG. 3, depicting additional features.

FIG. 4A is a schematic cross-sectional top view of example acoustic device 308 of FIG. 3, depicting additional features. For example, similarly named elements of FIG. 4A may be similar in structure and/or function to elements described with respect to FIG. 3. As shown in FIG. 4A, acoustic device 308 may include a housing 402 and a back cavity 404 disposed in housing 402. Further, acoustic device 308 may include a diaphragm 406, a signal collector 408, a steering head 410, signal projection assembly 310, a first electromagnet 416A, and a second electromagnet 416B disposed on back cavity 404 within housing 402.

In an example, diaphragm 406 may emit the acoustic signal. Further, signal collector 408 may redirect the acoustic signal emitted from diaphragm 406 to steering head 410. Furthermore, steering head 410 may orientate the redirected acoustic signal to signal projection assembly 310. In an example, signal projection assembly 310 may include a signal projection disk 412 and a reflector 414. In this example, reflector 414 may reflect the redirected acoustic signal from steering head 410 to signal projection disk 412.

Signal projection disk 412 may then output the acoustic signal to the operator. In an example, signal projection disk 412 and reflector 414 may include a curve-shaped smooth reflection surface. For example, signal projection disk 412 may include a concave shape and reflector 414 may include a convex shape. Signal projection disk 412 and reflector 414 may be positioned to output the acoustic signal. In this example, the redirected acoustic signal may be reflected from reflector 414 to signal projection disk 412 and then be reflected into an acoustic meatus of housing 402 by signal projection disk 412 so that the operator can receive the acoustic signal.

Further as shown in FIG. 4A, first electromagnet 416A may be disposed at a first end of signal projection assembly 310. Furthermore, second electromagnet 416B may be disposed at a second end of signal projection assembly 310. The second end may be opposite to the first end. In this example, processor 312 (e.g., as shown in FIG. 3) may control the movement of signal projection assembly 310 via first electromagnet 416A and second electromagnet 416B. In other examples, the movement of signal projection assembly 310 may also be controlled using a single electromagnet. In this example, a direction of current to the electromagnet may be controlled to cause the electromagnet to generate a magnetic field that attracts or repels signal projection assembly 310.

Figure 4B:
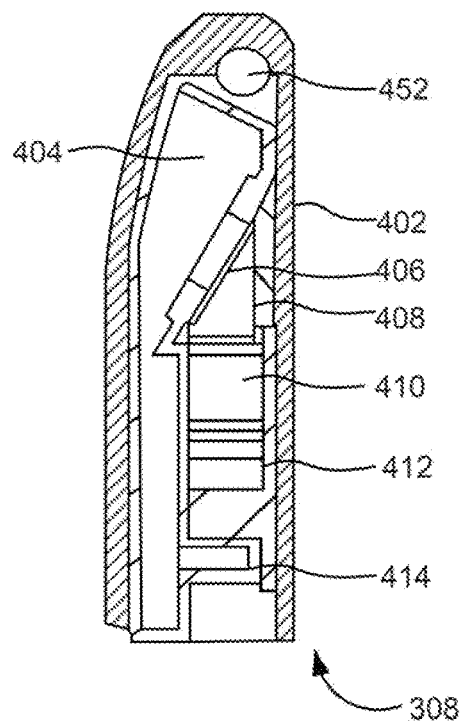
FIG. 4B is a schematic cross-sectional side view of the example acoustic device of FIG. 4A, depicting additional features.

FIG. 4B is a schematic cross-sectional side view of example acoustic device 308 of FIG. 4A, depicting additional features. For example, similarly named elements of FIG. 4B may be similar in structure and/or function to elements described with respect to FIG. 4A. Particularly, FIG. 4B is a cross-sectional side view of a portion B-B shown in FIG. 4A. As shown in FIG. 4B, acoustic device 308 may include a hinge 452 to pivotally connect acoustic device 308 to base housing 302 (e.g., as shown in FIG. 3). In an example, hinge 452 may support a pivotal movement of acoustic device 308 relative to base housing 302 and also provide a frictional force to hold acoustic device 308 at multiple positions outside base housing 302. An exploded view of acoustic device 308 is depicted in FIG. 5.

Figure 5:
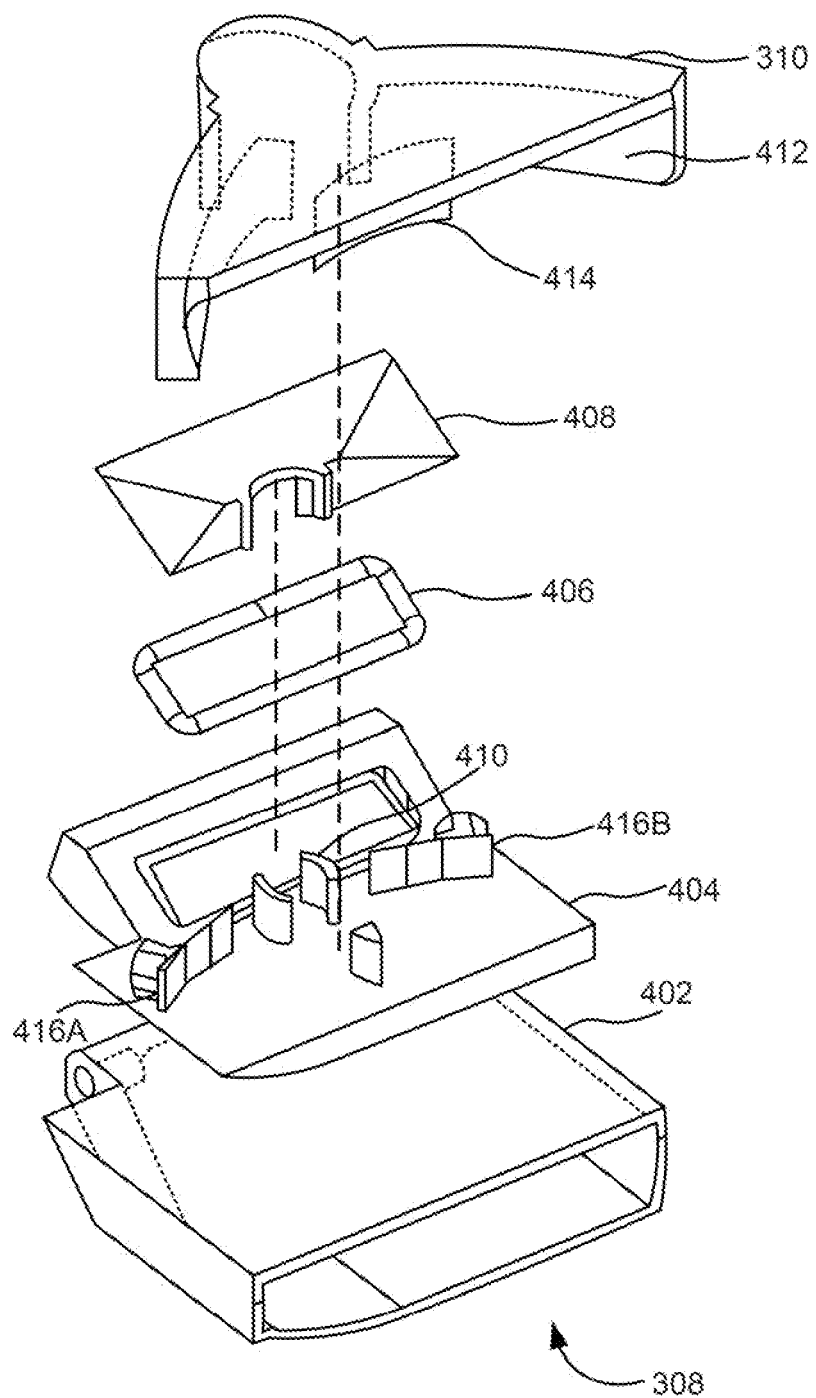
FIG. 5 is an exploded view of the example acoustic device of FIG. 4A.

FIG. 5 is an exploded view of example acoustic device 308 of FIG. 4A. For example, similarly named elements of FIG. 5 may be similar in structure and/or function to elements described with respect to FIG. 4A. In the example shown in FIG. 5, acoustic device 308 may produce low frequency sound (e.g., the acoustic signal) due to an airflow impedance of back cavity 404. Furthermore, diaphragm 406, disposed on back cavity 404, may emit the acoustic signal. In an example, diaphragm 406 may be suspended in a rigid frame such that diaphragm 406 can move forward and backward. A coil of wire may be attached to diaphragm 406 and suspended between poles of a permanent magnet. Applying an electrical signal to the coil of wire may cause the coil to move in the magnetic field. Further, diaphragm 406 may move due to the movement of the coil and thus air pressure waves are created which are detected as sound (i.e., the acoustic signal).

Further, signal collector 408 may be disposed on diaphragm 406. Signal collector 408 may collect the acoustic signal emitted by diaphragm 406 and redirect the acoustic signal to an outlet of steering head 410. Furthermore, steering head 410 may be positioned to direct the acoustic signal from signal collector 408 to signal projection disk 412 via reflector 414. In an example, the curve-shaped smooth reflection surface of signal projection disk 412 may reflect the acoustic signals to an identical direction instead of random radiation. Thus, the acoustic signals may be transmitted in a specific path.

Figure 6A:
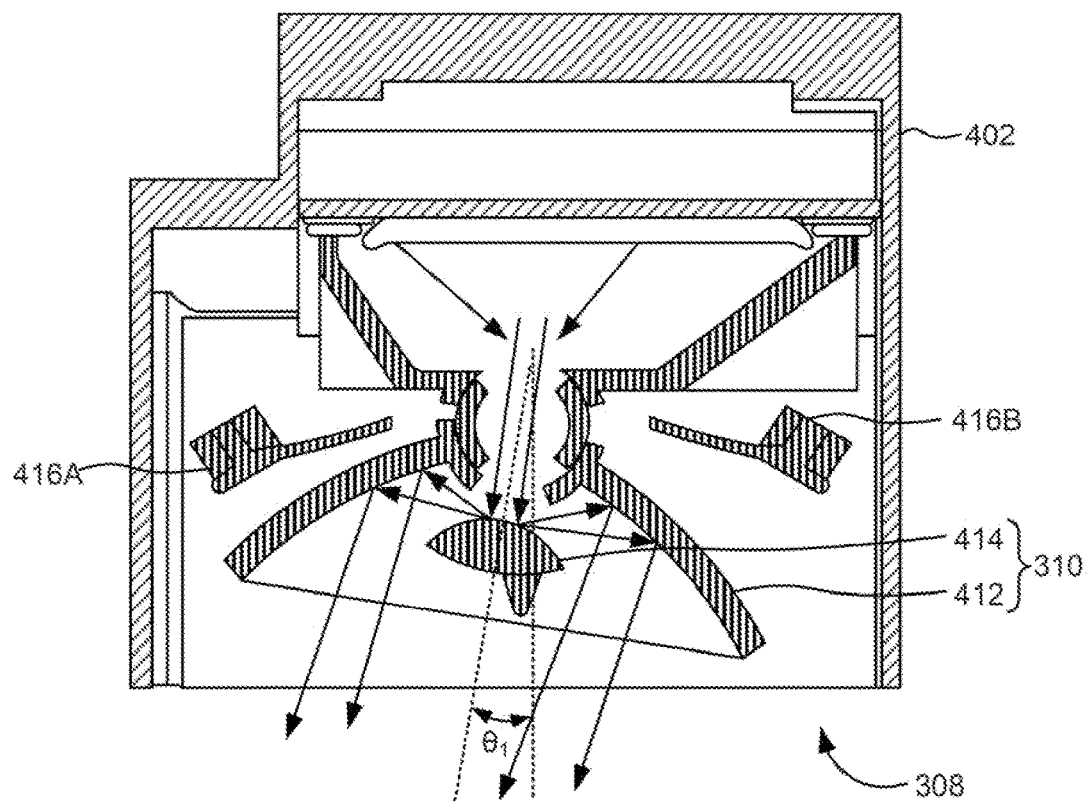
FIGS. 6A-6C are schematic cross-sectional top views of the example acoustic device of FIG. 4A, depicting multiple orientations of the signal projection assembly in a horizontal plane.
Figure 6B:
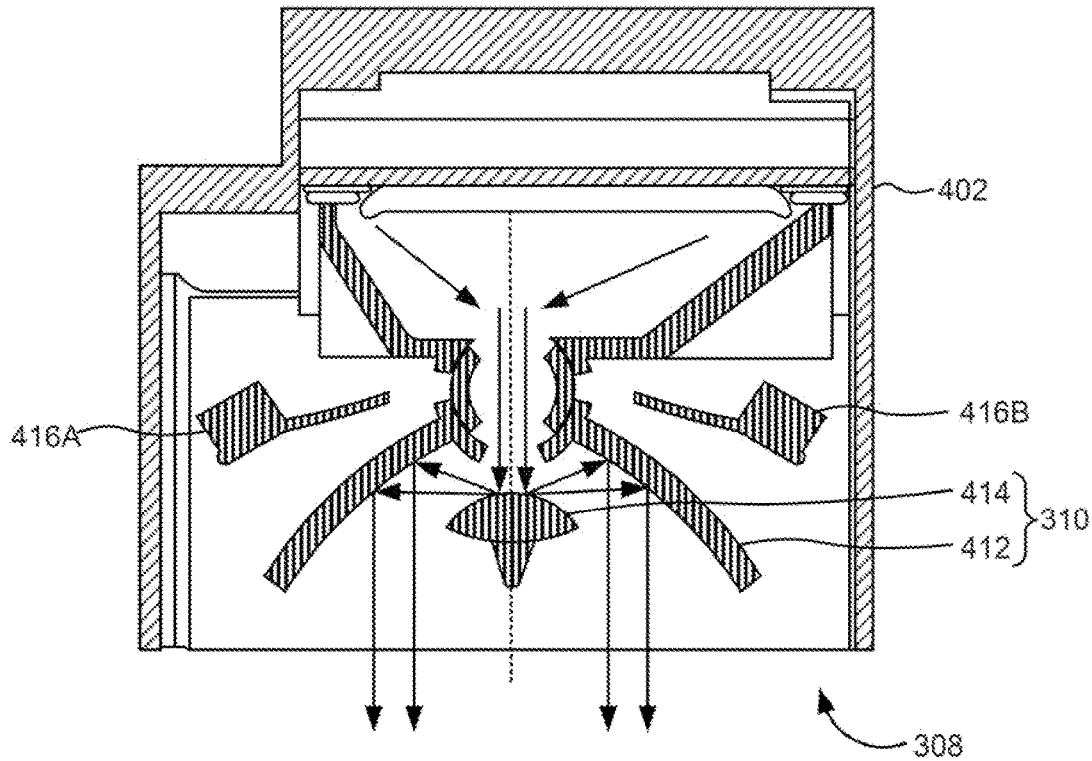
Figure 6C:
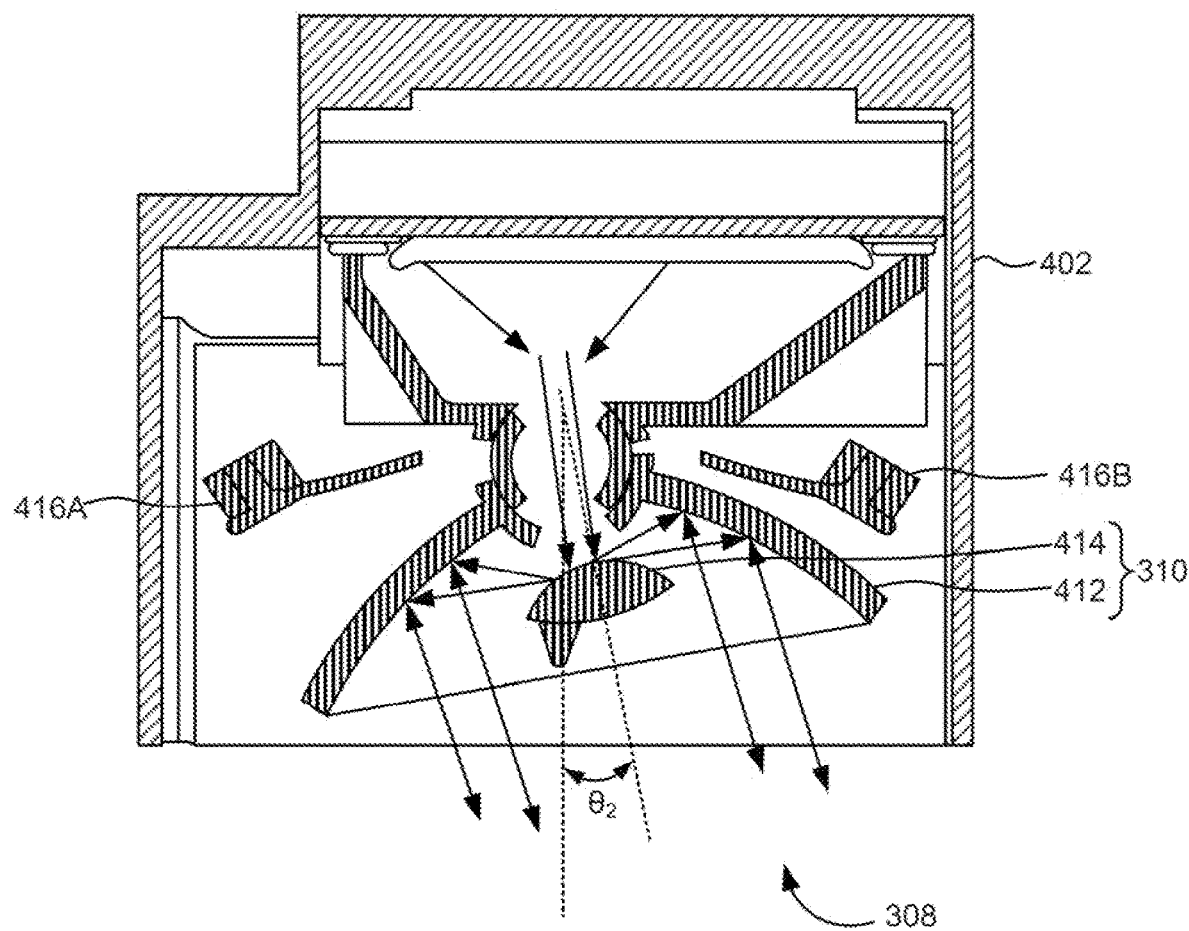

FIGS. 6A-6C are schematic cross-sectional top views of example acoustic device 308 of FIG. 4A, depicting multiple orientations of signal projection assembly 310 in a horizontal plane. For example, similarly named elements of FIGS. 6A-6C may be similar in structure and/or function to elements described with respect to FIG. 4A. As shown in FIG. 6A, signal projection assembly 310 may be rotated to a first angle $\theta_1$ (e.g., 16°) to modify the direction of the acoustic signal in the horizontal place based on the location of the facial feature of the operator. For example, the first angle may be adjusted via first electromagnet 416A or second electromagnet 416B to reflect the acoustic signal in a specific direction (e.g., as shown as arrows in FIG. 6A). In this example, the operator would have moved his head towards a left side relative to display housing 304 (e.g., as shown in FIG. 3).

As shown in FIG. 6B, signal projection assembly 310 may not be rotated in either of the direction, i.e., with 0° as a second angle. In this example, the operator would have sat straight relative to display housing 304 and the acoustic signal may be directed straight (e.g., as shown as arrows in FIG. 6B) towards the facial feature of the operator in the horizontal place.

As shown in FIG. 6C, signal projection assembly 310 may be rotated to a third angle $\theta_2$ (e.g., 17.5°) to modify the direction of the acoustic signal in the horizontal place based on the location of the facial feature of the operator. For example, the third angle may be adjusted by first electromagnet 416A or second electromagnet 416B to reflect the acoustic signal in a specific direction (e.g., as shown as arrows in FIG. 6C). In this example, the operator would have moved his head towards a right-side relative to display housing 304 (e.g., as shown in FIG. 3).

Figure 7:
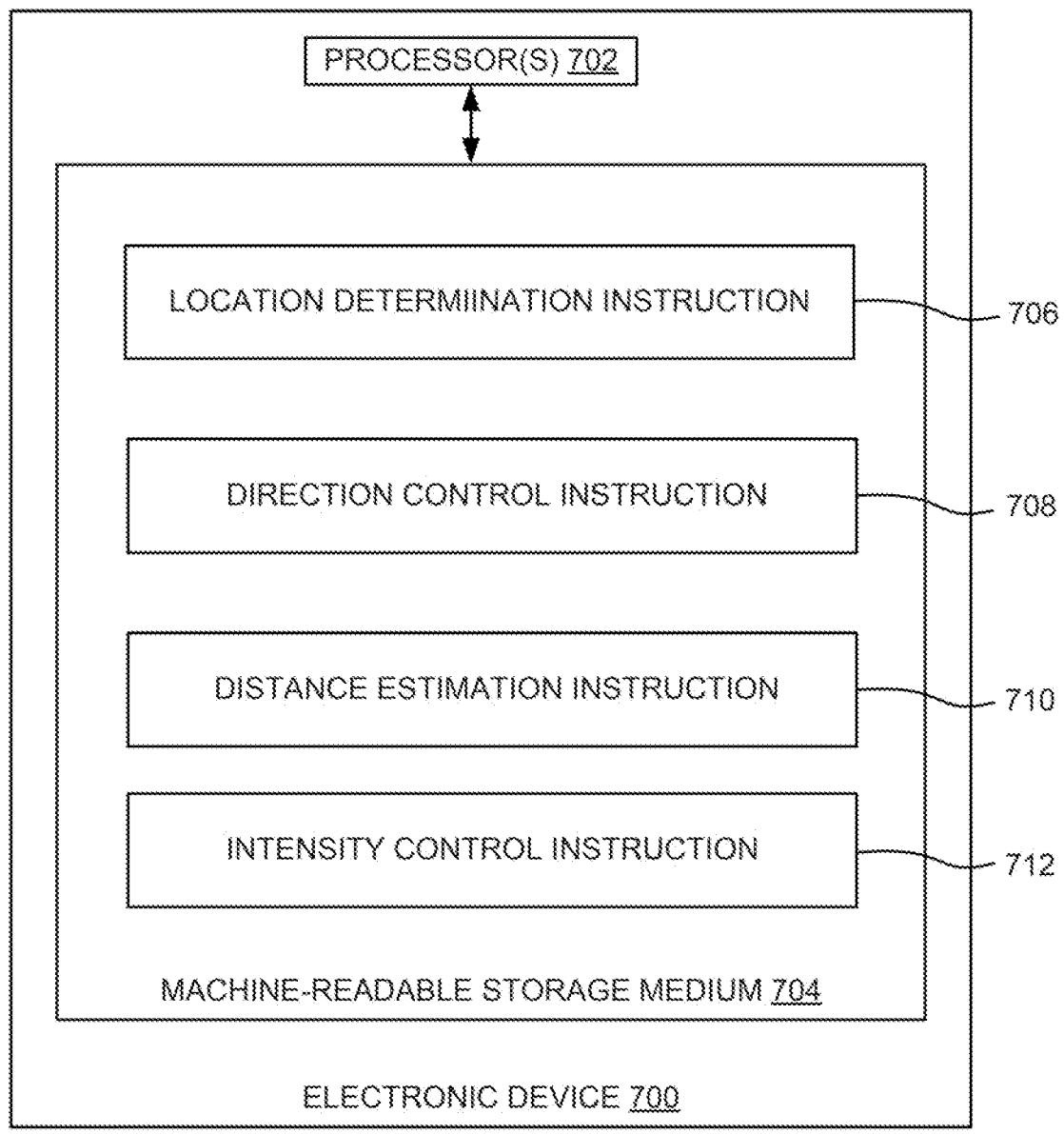
FIG. 7 is a block diagram of an example electronic device including a non-transitory machine-readable storage medium, storing instructions to control an intensity of an acoustic signal based on a distance of an operator's face.

FIG. 7 is a block diagram of an example electronic device 700 including a non-transitory machine-readable storage medium 704, storing instructions to control an intensity of an acoustic signal based on a distance of an operator's face. Electronic device 700 may include a processor 702 and machine-readable storage medium 704 communicatively coupled through a system bus. Processor 702 may be any type of central processing unit (CPU), microprocessor, or processing logic that interprets and executes machine-readable instructions stored in machine-readable storage medium 704.

Machine-readable storage medium 704 may be a random-access memory (RAM) or another type of dynamic storage device that may store information and machine-readable instructions that may be executed by processor 702. For example, machine-readable storage medium 704 may be synchronous DRAM (SDRAM), double data rate (DDR), Ram Bus® DRAM (RDRAM), Ram Bus® RAM, etc., or storage memory media such as a floppy disk, a hard disk, a CD-ROM, a DVD, a pen drive, and the like. In an example, machine-readable storage medium 704 may be a non-transitory machine-readable medium, where the term "non-transitory" does not encompass transitory propagating signals. In an example, machine-readable storage medium 704 may be remote but accessible to electronic device 700.

Machine-readable storage medium 704 may store instructions 706-712. In an example, instructions 706 may be executed by processor 702 to determine a location of an operator's face via a sensor. In an example, instructions to determine the location of the operator's face may include instructions to:

retrieve information identifying and describing a facial feature of the operator from an image captured via the sensor. In an example, the information identifying and describing the facial feature may include information identifying and describing hair, an eyebrow, an eye, a glass, an ear, a forehead, a nose, a mouth, or any combination thereof.

determine the location of the operator's face based on the information identifying and describing the facial feature. In an example, a face recognition algorithm may be applied on the image captured via the sensor to determine the location of the operator's face.

Instructions 708 may be executed by processor 702 to control a direction of projection of an acoustic signal from an acoustic device in a horizontal plane, a vertical plane, or a combination thereof based on the determined location. In an example, instructions to control the direction of projection of the acoustic signal from the acoustic device in the vertical plane may include instructions to control an angle of rotation of the acoustic device relative to a housing of electronic device 700 based on the determined location to control the direction of projection of the acoustic signal in the vertical plane. In this example, the acoustic device may be pivotably disposed in the housing to move between a first position within the housing and a second position outside the housing.

In another example, instructions to control the direction of projection of the acoustic signal from the acoustic device in the horizontal plane may include instructions to control an angle rotation of a signal projection assembly pivotally disposed within the acoustic device based on the determined location to control the direction of projection of the acoustic signal in the horizontal plane.

Instructions 710 may be executed by processor 702 to estimate a distance of the operator's face from electronic device 700 via the sensor. An example sensor may include a time-of-flight (ToF) camera. An example ToF camera may be a "depth camera". The term "ToF camera" may refer to a sensor that can emit light in the infrared spectrum and then record the speed of the reflected light from a target object (e.g., the user). Based on a time difference between the emission of the light and its return to the ToF camera after being reflected by the target object, processor 702 may measure the distance between the target object (i.e., operator's face) and the ToF camera. Instructions 712 may be executed by processor 702 to control an intensity of the acoustic signal based on the estimated distance. In an example, processor 702 may increase or decrease the intensity of the acoustic signal emitted from the acoustic device based on the estimated distance.

Figure 8A:
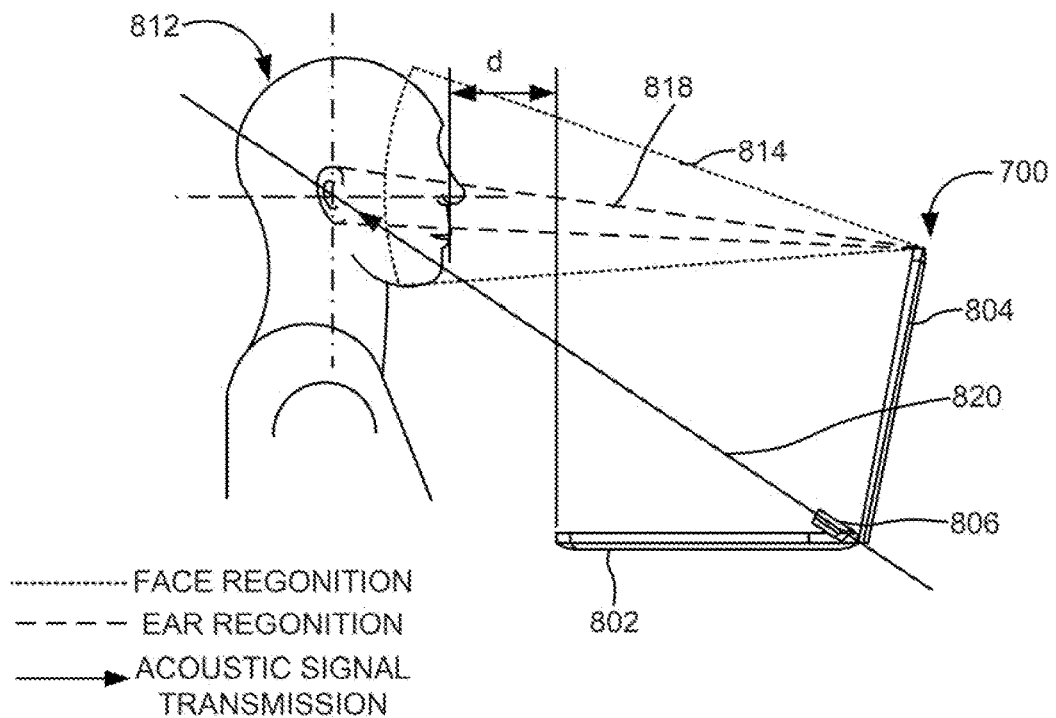
FIGS. 8A-8C are schematic side view, front view, and top view, respectively, of the example electronic device of FIG. 7, depicting a location and a distance of the operator's face relative to the electronic device.
Figure 8B:
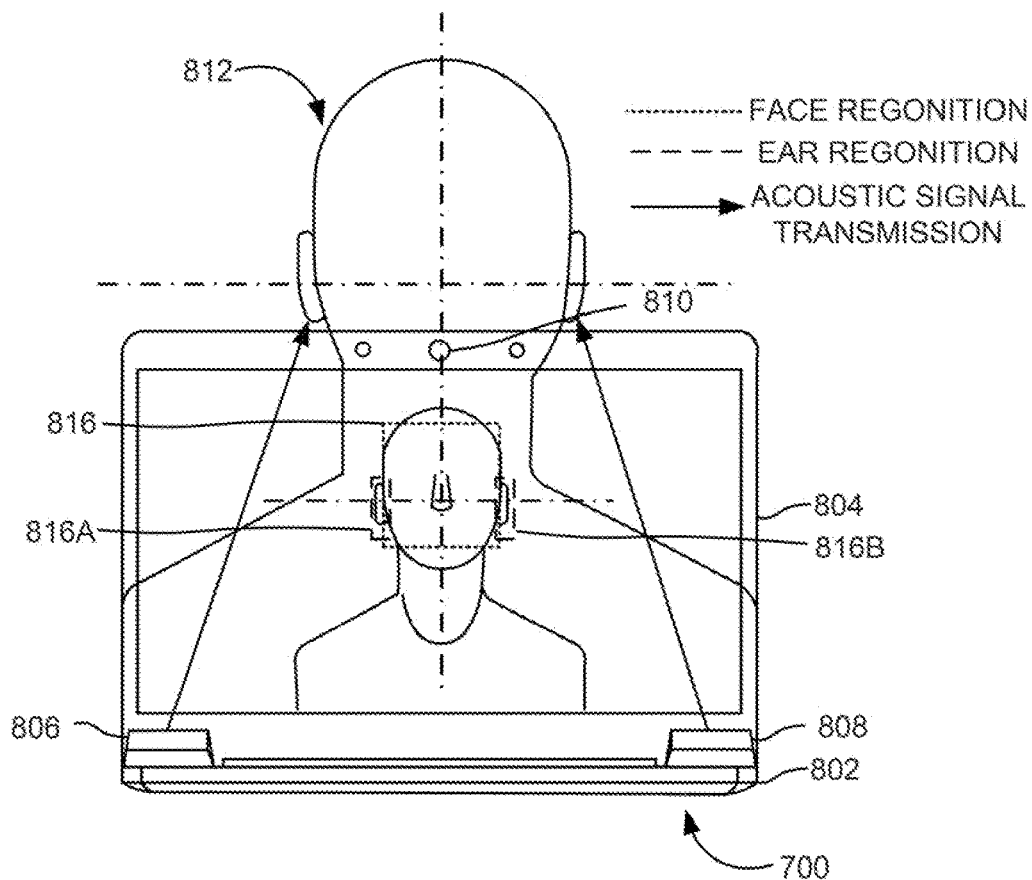
Figure 8C:
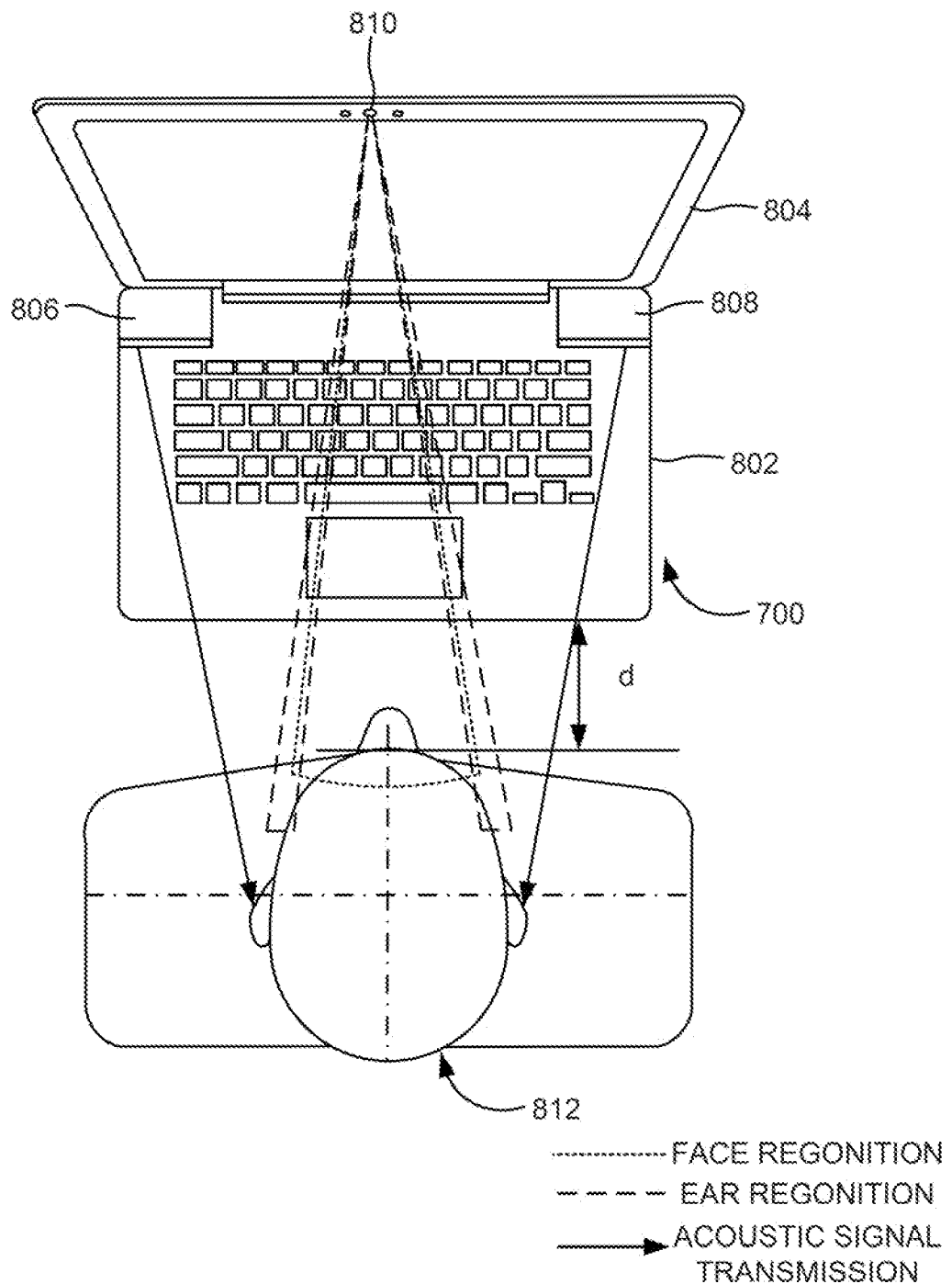

FIGS. 8A-8C are schematic side view, front view, and top view, respectively, of example electronic device 700 of FIG. 7, depicting a location and a distance of the operator's face relative to electronic device 700. For example, similarly named elements of FIGS. 8A-8C may be similar in structure and/or function to elements described with respect to FIG. 7. Example electronic device 700 may include a base housing 802 and a display housing 804. For example, base housing 802 may house first acoustic device 806 and second acoustic devices 808. Further, display housing 804 may house a sensor 810.

During operation, a location of a face of an operator 812 may be determined via sensor 810. The location of operator's face (e.g., 816 as shown in FIG. 8B) relative to display housing 804 is depicted by a dotted line 814. Further, facial features 816A and 816B (i.e., ears of operator 812 as shown in FIG. 8B) may be located as shown by a dotted line 818. Furthermore, based on the location of facial features 816A and 816B, projection of acoustic signals from first acoustic device 806 and second acoustic devices 808 may be controlled in a horizontal plane, a vertical plane, or a combination thereof, as shown by arrowed lines 820. Further, a distance "d" (e.g., 25 cm) of the operator's 812 face from electronic device 700 may be estimated. Based on the distance, an intensity of the acoustic signal may be controlled.

Figure 9A:
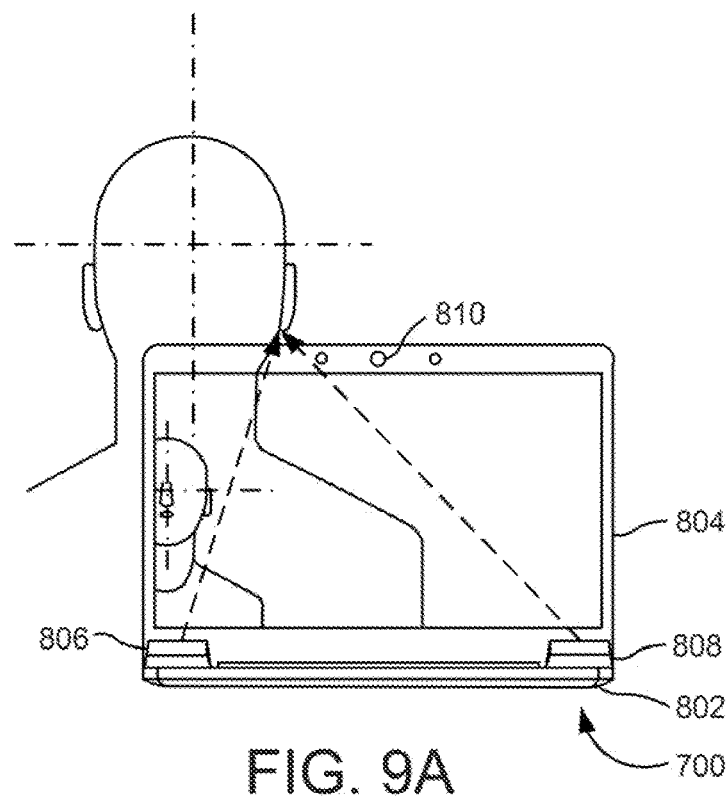
FIGS. 9A and 9B are schematic front views of the example electronic device of FIG. 7, depicting additional features.
Figure 9B:
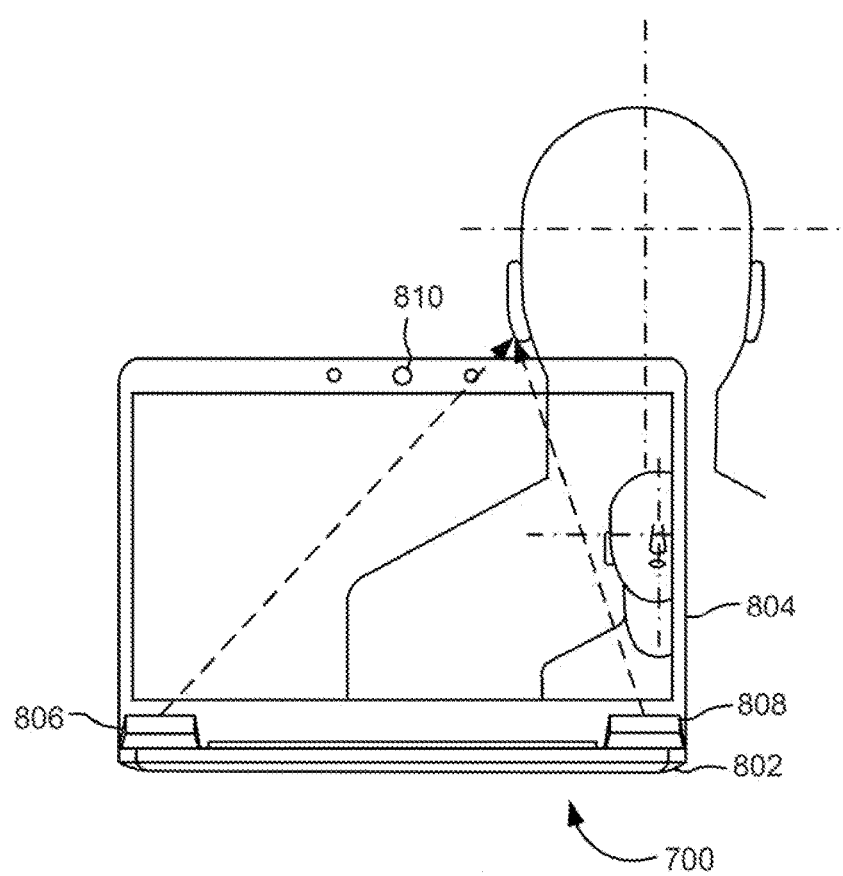

FIGS. 9A and 9B are schematic front views of example electronic device 700 of FIGS. 8A-8C, depicting additional features. For example, similarly named elements of FIGS. 9A and 9B may be similar in structure and/or function to elements described with respect to FIGS. 8A-8C. As shown in FIGS. 9A and 9B, sensor 810 may not be able to detect/locate one of the ears of operator 812 because of the position of operator 812 relative to display housing 804. In the example shown in FIG. 9A, sensor 810 may not be able to detect a left ear, and in the example shown in FIG. 9B, sensor 810 may not be able to detect a right ear. In these examples, when an ear is out-off recognition range, first acoustic device 806 and second acoustic device 808 may project the acoustic signal to the single detected ear. In other examples, when the right ear and/or the left ear is out-off recognition range, the location determination and/or distance estimation may be disabled such that first acoustic device 806 and second acoustic devices 808 may direct the acoustic signal in a defined/default direction and with a defined/default intensity.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. An electronic device comprising:
 a housing;
 a first acoustic device, pivotally disposed in the housing, to direct an acoustic signal in a direction, wherein the first acoustic device is to move between a first position within the housing and a second position outside the housing;
 a second acoustic device pivotally disposed in the housing, wherein the second acoustic device is to move between a third position within the housing and a fourth position outside the housing;
 a camera to capture an image of an area in front of the electronic device; and
 a processor operatively coupled to the camera, the first acoustic device, and the second acoustic device, wherein the processor is to:
  determine a location of a facial feature of an operator using the captured image;
  control an angle of rotation of the first acoustic device relative to the housing based on the location of the facial feature to modify the direction of the acoustic signal;
  determine a location of a first facial feature and a second facial feature of the operator using the captured image;
  control the angle of rotation of the first acoustic device relative to the housing based on the location of the first facial feature; and
  control an angle of rotation of the second acoustic device relative to the housing based on the location of the second facial feature.

2. The electronic device of claim 1, wherein the facial feature comprises an ear.

3. The electronic device of claim 1, wherein the processor is to:
 retrieve information identifying and describing the facial feature of the operator from the captured image;
 compare the retrieved information with a set of stored facial landmarks; and
 determine the location of the facial feature based on the comparison.

4. The electronic device of claim 1, further comprising:
 an electromagnet assembly disposed within the housing, wherein the processor is to control the angle of rotation of the first acoustic device relative to the housing via the electromagnet assembly.

5. An electronic device comprising:
 a display housing having a sensor;

a base housing connected to the display housing, the base housing comprising:
 a first acoustic device pivotably disposed within the base housing, wherein the first acoustic device is to move between a first position within the base housing and a second position outside the base housing, and wherein the first acoustic device comprises:
  a first signal projection assembly pivotably disposed within the first acoustic device to direct a first acoustic signal in a first direction;
 a second acoustic device pivotably disposed within the base housing, wherein the second acoustic device is to move between a third position within the base housing and a fourth position outside the base housing; and wherein the second acoustic device comprises:
  a second signal projection assembly pivotably disposed within the second acoustic device to direct a second acoustic signal in a second direction; and
a processor to:
 detect a movement of a first facial feature and a second facial feature of an operator via the sensor;
 control a pivotal movement of the first signal projection assembly based on the detected movement of the first facial feature; and
 control a pivotal movement of the second signal projection assembly based on the detected movement of the second facial feature.

6. The electronic device of claim 5, wherein the first acoustic device comprises:
 a first electromagnet disposed at a first end of the first signal projection assembly;
 a second electromagnet disposed at a second end of the first signal projection assembly, wherein the second end is opposite to the first end, and wherein the processor operatively coupled to the sensor and the first acoustic device is to control the movement of the first signal projection assembly via the first electromagnet and the second electromagnet.

7. The electronic device of claim 5, wherein the first acoustic device comprises:
 a back cavity;
 a diaphragm disposed on the back cavity to emit the first acoustic signal;
 a signal collector to redirect the first acoustic signal emitted from the diaphragm; and
 a steering head to orientate the redirected first acoustic signal to the first signal projection assembly.

8. The electronic device of claim 7, wherein the first signal projection assembly comprises:
 a signal projection disk; and
 a reflector to reflect the redirected first acoustic signal from the steering head to the signal projection disk.

9. The electronic device of claim 8, wherein the signal projection disk and the reflector comprise a curve-shaped smooth reflection surface, and wherein the signal projection disk and the reflector are positioned to output the first acoustic signal.

10. The electronic device of claim 5, wherein the processor is to:
 control an angle of rotation of the first acoustic device relative to the base housing based on the detected movement of the first facial feature.

11. The electronic device of claim 10, wherein the processor is to:
 control an angle of rotation of the first signal projection assembly to modify the direction of the first acoustic signal in a horizontal plane; and
 control the angle of rotation of the first acoustic device to modify the direction of the first acoustic signal in a vertical plane.

12. The electronic device of claim 5, wherein the sensor comprises a webcam, an infrared proximity sensor, a stereoscopic camera, an ultrasonic sensor, or a depth camera.

13. A non-transitory machine-readable storage medium encoded with instructions that, when executed by a processor of an electronic device, cause the processor to:
 determine a location of a first facial feature and a location of a second facial feature of an operator via a sensor;
 control an angle of rotation of a first acoustic device relative to a housing based on the location of the first facial feature, wherein the first acoustic device is pivotably disposed in the housing to move between a first position within the housing and a second position outside the housing;
 control an angle of rotation of a second acoustic device relative to the housing based on the location of the second facial feature, wherein the second acoustic device is to move between a third position within the housing and a fourth position outside the housing;
 estimate a distance of a face of the operator from the electronic device via the sensor; and
 control an intensity of a first acoustic signal based on the estimated distance.

14. The non-transitory machine-readable storage medium of claim 13, wherein instructions to control the angle of rotation of the first acoustic device comprise instructions to:
 control an angle rotation of a signal projection assembly pivotably disposed within the first acoustic device based on the determined location of the first facial feature.

15. The non-transitory machine-readable storage medium of claim 13, wherein instructions to control the angle of rotation of the first acoustic device comprise instructions to:
 control the angle of rotation of the first acoustic device relative to the housing of the electronic device based on the determined location of the first facial feature to control a direction of projection of the first acoustic signal in a vertical plane.

16. The non-transitory machine-readable storage medium of claim 13, wherein instructions to determine the location of the first facial feature comprise instructions to:
 retrieve information identifying and describing the first facial feature of the operator from an image captured via the sensor; and
 determine a location of the operator's face based on the information identifying and describing the first facial feature.

17. The non-transitory machine-readable storage medium of claim 16, wherein the information identifying and describing the first facial feature comprises information identifying and describing hair, an eyebrow, an eye, a glass, an ear, a forehead, a nose, a mouth, or any combination thereof.

18. The non-transitory machine-readable storage medium of claim 13, wherein the sensor comprises a time-of-flight (ToF) camera.

* * * * *